3,463,926
DIFFERENTIAL LIGHT SENSING MEANS WITH ONE PHOTOMULTIPLIER CONNECTED TO ONE OF THE DYNODES OF THE OTHER PHOTOMULTIPLIER
Bob V. Markevitch, Palo Alto, Calif., assignor to Ampex Corporation, Redwod City, Calif., a corporation of California
Filed Dec. 18, 1967, Ser. No. 691,584
Int. Cl. H01j 39/12
U.S. Cl. 250—207                                4 Claims

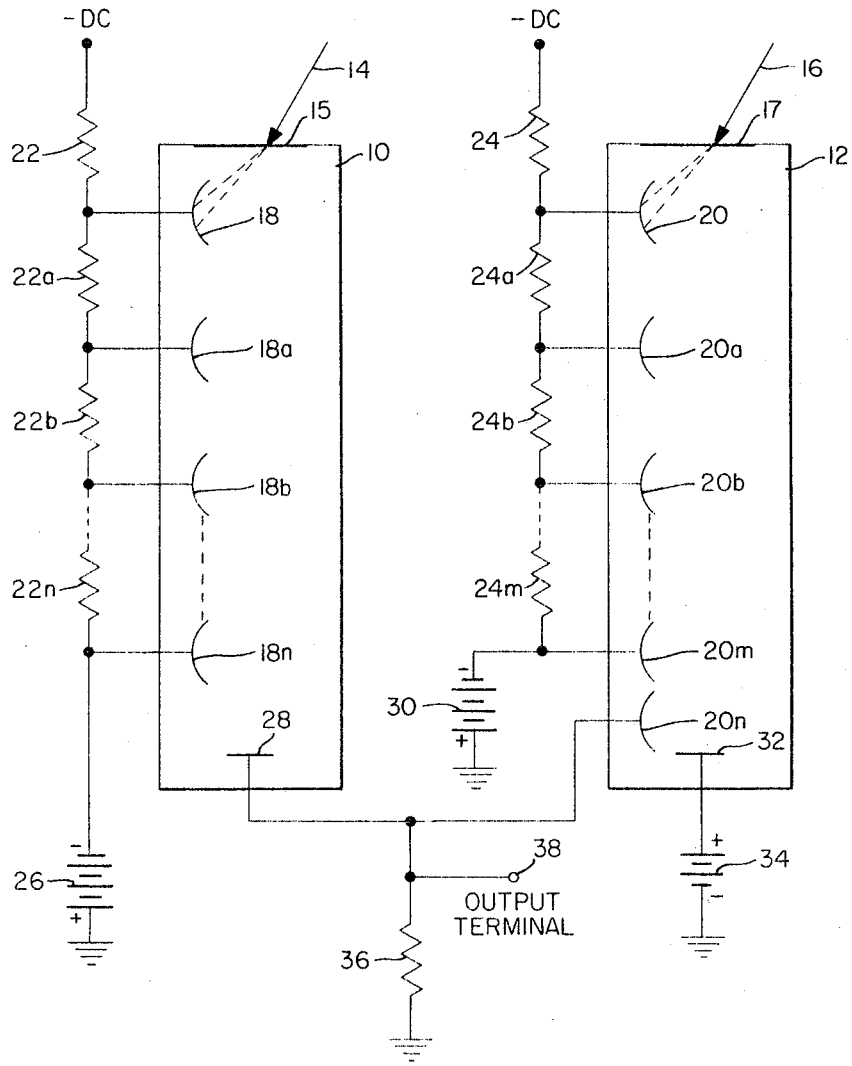

ABSTRACT OF THE DISCLOSURE

Light is collected by two photomultipliers, wherein the last dynode of one is connected to the anode of the other. The anode supplies the dynode current if the gain is balanced, resulting in zero output. A change in light level unbalances the circuit and provides a representative output signal.

Background of the invention

Prior art systems for sensing the difference between two light levels generally utilize a pair of photomultipliers each arranged to receive a light beam, wherein the signals generated by each photomultiplier are then passed to a differential amplifier. The amplifier makes a comparison of the incoming signals and provides an output which is indicative of the difference, and sense, of the light levels. In such prior art systems, if the difference between the light levels is small, considerable drift may be added by the differential amplifier. That is, the drift due to the amplifier would adversely affect the signal generated by a small light difference, thus preventing accurate sensing of the difference.

Summary of the invention

The present invention provides a circuit which is capable of sensing small differences in two light levels, with a minimum introduction of peripheral circuit drift. The last dynode of one photomultiplier is connected to the anode of another photomultiplier, and if the gain is properly balanced the anode will supply the dynode current. The resultant current in a load resistor attached thereto will be zero. A change in light level will unbalance the circuit and produce an output indicative of the difference in light levels. Thus a differential amplifier is not required, and accordingly, the drift due thereto is neatly eliminated.

Brief description of the drawing

The single figure is a schematic diagram of the invention.

Description of the preferred embodiment

Regarding the figure, a pair of photomultipliers 10 and 12 are disposed to view respective light beams depicted herein as 14 and 16. The photomultipliers are generally conventional in design and thus have the usual series of dynodes generally indicated herein by numerals 18 and 20 respectively. In addition the photomultipliers 10 and 12 include photocathode elements 15 and 17 respectively, which provide electrons therefrom to the first dynodes in response to impingement by the electron beams 14 and 16. The first dynode of each of the photomultipliers 10 and 12 is coupled to a negative direct current (DC) source (not shown) via biasing resistors 22 and 24 respectively. In conventional fashion, the succeeding dynodes 18a–18n and 20a–20n are connected resistively to previous dynodes by biasing resistors 22a, 22b, 22n, etc., and 23a, 24b, 24m, etc., wherein the series of biasing resistors determine (e.g., increase) the positive bias of the succession of dynodes.

The last dynode 18n of photomultiplier 10 is coupled to the negative terminal of a direct current supply 26 and from thence to ground. An anode 28 of the photomultiplier 10 is connected to the last dynode 20n of the photomultiplier 12. A second to last dynode 20m is biased by resistor 24m, and is also connected to the negative terminal of a direct current source 30 and thence to ground. An anode 32 of the photomultiplier 12 is connected to the positive terminal of a direct current source 34 and thence to ground.

A load resistor 36 is coupled at one end to the junction between anode 28 and dynode 20n, and at the other end to ground, whereby an output terminal 38 is provided via the junction.

In operation, at such time as the light levels of the beams 14, 16 are equal, and if the gain is properly balanced, the anode 28 will supply the dynode 20n current, and the resultant current in the load resistor 36 is zero as seen at the output terminal 38. However, if the light level of either one beam, or of both beams, changes the circuit will become unbalanced, and current will flow through the load resistor 36 giving rise to an output signal at the output terminal 38. The polarity of the output signal is indicative of which photomultiplier is receiving more, or less light. That is, if photomultiplier 10 receives more light than photomultiplier 12 then more current will blow through anode 28 than dynode 20n and the difference will flow through load resistor 36 producing a negative voltage at the output terminal 38. If the opposite is true, then the direction of current flow through resistor 36 will be reversed and a positive voltage will be developed at terminal 38.

Accordingly, it may be seen that the invention provides for taking the difference sensed by the circuit as early as possible, and also eliminates the drift introduced by an operational amplifier by simply eliminating the need for an amplifier. The only drift is due to the photomultipliers and this drift is present in prior art systems as well.

Although the invention has been described herein with respect to a single embodiment, it is to be understood that various modifications could be made thereto within the spirit of the invention. For example, the form of biasing employed for the dynodes can be varied, i.e., the same or a varied number of supplies, transistor or Zener diode circuits, could be employed. Thus emitter follower circuits could be used in place of the biasing resistors 22, 24 to provide a greater inter-dynode voltage stability independent of the light level. Also the load resistor 36 could be replaced by a tuned circuit to provide selective frequency tuning, by an emitter follower circuit, or by other standard coupling circuits. Further, the anode 28 may be coupled to other than the last dynode 20n. Thus it is not intended to limit the invention except as defined in the following claims.

I claim:
1. A circuit for sensing the difference between the light levels of two light beams, including a pair of photomultiplier tubes each having a series of dynodes and an anode and disposed to receive a light beam via a photocathode element, the circuit comprising the combination of:
   means for negatively biasing selected ones of said series of dynodes of each photomultiplier;
   the anode of a first photomultiplier being connected to a selected dynode of the second photomultiplier; and
   means for positively biasing the anode of the second photomultiplier;
   wherein any difference in light levels of said beams is represented by an output current signal extracted from the junction between said anode of the first photomultiplier and the selected dynode of the second photomultiplier.

2. The circuit of claim 1 wherein said means for negatively biasing includes negative DC sources coupled to the first and last dynodes of the first photomultiplier, and negative DC sources coupled to the first and the second to last dynodes of the second photomultiplier.

3. The circuit of claim 1 wherein the anode of the first photomultiplier is connected to the last dynode of the second photomultiplier.

4. The circuit of claim 1 further including a load resistor coupled between said junction and ground, wherein a difference in light level is represented as an output current signal at said junction.

References Cited

UNITED STATES PATENTS

| | | | |
|---|---|---|---|
| 2,590,827 | 3/1952 | Stamm et al. | 250—207 X |
| 2,617,042 | 11/1952 | Wouters | 250—83.3 |
| 2,842,672 | 7/1958 | Thomsen | 250—207 X |

JAMES W. LAWRENCE, Primary Examiner

C. R. CAMPBELL, Assistant Examiner

U.S. Cl. X.R.

250—83.3